United States Patent [19]

Dubois

[11] Patent Number: 5,532,299

[45] Date of Patent: Jul. 2, 1996

[54] PROCESS FOR IMPROVING THE MECHANICAL AND SEALING PROPERTIES OF ELASTOMER GASKETS, JOINTS AND SEALS AND THE SEAL OBTAINED WITH THIS PROCESS

[75] Inventor: Jean-Paul Dubois, Coutras, France

[73] Assignee: KSB S.A., Courbevoie, France

[21] Appl. No.: 441,806

[22] Filed: May 16, 1995

Related U.S. Application Data

[60] Division of Ser. No. 197,586, Feb. 17, 1994, Pat. No. 5,489,631, which is a continuation-in-part of Ser. No. 49,982, Apr. 20, 1993, abandoned, which is a continuation of Ser. No. 777,330, Dec. 2, 1991, abandoned.

[30] Foreign Application Priority Data

Apr. 6, 1990 [FR] France .................................. 90 04419

[51] Int. Cl.⁶ .............................. C08L 1/02; C08L 23/02; C08K 3/47; C08K 3/04
[52] U.S. Cl. .............................. 524/13; 524/35; 524/494; 524/495; 524/496; 524/184
[58] Field of Search ................................ 524/13, 35, 91, 524/100, 346, 492, 493, 494, 495, 496, 514, 34; 525/184

[56] References Cited

U.S. PATENT DOCUMENTS

| | | | |
|---|---|---|---|
| 3,853,796 | 12/1974 | Oldack et al. | 525/123 |
| 4,514,541 | 4/1985 | Frances | 524/496 |
| 4,837,281 | 6/1989 | Hibbard et al. | 525/233 |

OTHER PUBLICATIONS

International Standard ISO 1629, Second Edition 1987-Dec.-01.

*Primary Examiner*—Peter A. Szekely
*Attorney, Agent, or Firm*—Darby & Darby

[57] ABSTRACT

A process for the improving the mechanical properties and the sealing properties of elastomer gaskets. The elastomer is prepared by adding to an elastomer composition, at the time of the preparation phase, fibers having an average length on the order of 2 to 12 mm. The elastomer is molded, by injection or by compression transfer, such that the orientation of the fibers in the elastomer is obtained by positioning and orienting of the nozzle or the channel inlets into the mold cavity. The fibers, embedded in the elastomer have an orientation that is, parallel to a surface against which a ridge of the closure device comes into contact and perpendicular to the closure device when the butterfly valve is shut.

1 Claim, 4 Drawing Sheets ic or polysulfuric type bonds or bonds of the carbon-carbon
PROCESS FOR IMPROVING THE MECHANICAL AND SEALING PROPERTIES OF ELASTOMER GASKETS, JOINTS AND SEALS AND THE SEAL OBTAINED WITH THIS PROCESS This is a division of Ser. No. 08/197,586, filed Feb. 17, 1994, now U.S. Pat. No. 5,489,631 which is a continuation-in-part application of U.S. Ser. No. 08/049,982 filed on Apr. 20, 1993, now abandoned which is a continuation application of U.S. Ser. No. 07/777,330, filed Dec. 2, 1991 now abandoned.

FIELD OF THE INVENTION

The present invention relates generally to a process for improving the dynamic sealing of gaskets, joints and seals. More specifically, the present invention relates to a process for improving the dynamic sealing of elastomer seals that are used in butterfly valves.

BACKGROUND OF THE INVENTION

It is generally known in applications of this type that sealing is achieved by creating contact pressure between two parts, one of which is at least partially made of an elastomer, which constitutes the joint, while the other, made of metal for example, constitutes the closure means.

The desire of the user is that the contact pressure created in order to effect the sealing be greater, in an enduring manner, than a predetermined, minimal amount.

In fact, dynamic joints are turned on and off, and thus are subjected or not subjected to contact pressure. It is therefore important that the sealing be retained despite the multiple times that they are utilized.

In addition, the transition from the state of utilization to the state of non-utilization causes the joint to be subjected to various forces and constraints such as friction, elongation and shearing, etc., which call upon its intrinsic properties, in particular the relaxation properties of the elastomer, its behavior of viscosity and elasticity, its mechanical properties and the change in the these properties as a function of temperature and, consequently, the carrying limitations of the joint (the domains of pressure, of temperature, etc.) which are intimately connected with these properties.

In order to explain the problem more precisely, the operation of a sealing gasket of a butterfly valve will be described in detail in the following.

The objective sought with a butterfly valve is to achieve sealing for a given pressure of fluid. However, the best results are achieved when the forces applied to move the closure means are the weakest, and when the contact pressure does not change over time.

It is well known that, between the beginning of the contact between the closure means and the gasket and the end of the movement of the closure means, there is a gradual penetration of the ridge of the closure means into the gasket and a displacement of a wave of elastomer next to the ridge of the closure means.

At the end of the movement, when the valve is shut, there is a section of elastomer which is subjected to constraints of compression due to the crushing and pressing of the gasket, and to the constraints of shearing due to the displacement and to the elongation of the elastomer, considering the friction coefficient existing between the ridge of the closure means and the gasket, It is clear that the energy or force required provided in order to displace the closure means is all the more significant to the extent that the penetration of the ridge into the gasket is significant and the volume of the elastomer displaced is significant.

For a valve in the closed, resting position, the phenomena of relaxation will occur. Volumes of elastomer will again enter equilibrium on both sides of the ridge of the closure means and the elastomer subjected to the compression of the ridge will flow from one side to the other, causing a reduction in the contact pressure and thus a reduction in the sealing level.

The opening of the valve consists of extracting the ridge of the closure means from the gasket. Due to adhesion and to the friction coefficient between the two parts, the elastomer will begin to be stretched under the effect of the movement of the ridge before sliding and a new wave of elastomer will form next to the ridge in opposition to this movement. Here too, the force to be applied will be all the more significant to the extent that the wave is significant.

These phenomena are very classic and the design of valves of this type take them into account, on the one hand by appropriately dimensioning the handle extensions and the manipulators, and on the other hand by increasing the penetration of the ridge of the closure means into the gasket or by increasing the modulus of elasticity of the elastomer. But these solutions give rise to significant inconveniences. From a commercial perspective, there is an increased cost for the valve. From a technical perspective, there are elevated constraints of shearing in the elastomer with a significant risk of tearing when the conditions of pressure or temperature become severe.

At present, the manufacture of joints makes use of appropriate families of elastomers, the formulas and the techniques of manufacture remaining conventional.

Thus, these parts may be made by using a blend with a rubber base of varying make-up: SBR(Styrene-butadiene rubber), EPDM (terpolymer of ethylene, propylene and a diene with the residual unsaturated portion of the diene in the side chain), EPM(Ethylene-propylene copolymer), butadiene-acrylonitrile, polychloroprene, polyethylene chlorosulfonate, fluorous polymers, etc.

The formulation of these rubbers is conventional, based on reinforcers such as carbon blacking of various grades, plasticizers and vulcanization systems effecting monosulfuric or polysulfuric type bonds or bonds of the carbon-carbon type.

The sealing joints are made by molding (done by the vulcanization of the elastomer substantially simultaneously with the molding; the molding may be done by injection, by compression transfer or by the compression of a blank.

SUMMARY OF THE INVENTION

It is therefore an object, of the present invention to improve the characteristics and the behavior of the joints described above.

For this purpose, the present invention proposes a formation technique which consists of a molding by injection or by compression transfer where the orientation of the fibers included in the elastomer will be effected by means of the appropriate positioning and orientation of the nozzles or channels used in order to effect the injection or the transfer into the cavity of the mold.

The formation technique used in the process in accordance with the invention may consist of an injection technique or a compression transfer technique as well.

In the case of the injection technique for molding, the orientation of the fibers included in the elastomer will be effected by means of the appropriate positioning and orientation of the injection nozzles for the molding material, it being understood that the fibers orient themselves to a significant extent in the direction of the flow of the material.

For the principle of molding by compression transfer, the injection channels are connected to a compression chamber which encloses a molding material including the fibers. The transfer of the material toward the mold is caused by compression by a piston in the interior of the chamber. Here too, the orientation of the fibers depends on the manner of the flow in the channels and in the mold cavity.

Thus, for example, in the case of the molding of a sealing joint in the form of a cylinder or a torus, the injection nozzles will eject at the position of the radial faces of the joint, parallel to the longitudinal axis of the joint.

In this case, the fibers will orient themselves within the material parallel to the axis to a significant extent.

Upon injection of the elastomer composition and of the fibers by multiple injection nozzles at tangential axes to the interior surfaces, the fibers will spontaneously orient themselves in the axis of the nozzles and will therefore position themselves in the interior of the mold concentrically with respect to the principal axis of the mold, and thus in a parallel fashion to the interior surface.

The molding by compression molding is done in two stages, to wit:

one stage for forming the blank, by injection or by extrusion, for example; and one stage for conforming the blank in order to obtain the finished product.

In this case, one achieves the orientation of the fibers in the interior of the blank by virtue of the flow properties of the material, this orientation being such as to be able to lead to the desired orientation at the end of the stage of conforming the blank.

In order to obtain a sealing gasket for a butterfly valve, the mold has a cavity with a cross-section in the shape of a "C". The injection is carried out with the use of nozzles or channel ejecting at the position of the angular area adjacent to the surface bordering the core of the C-form. The orientation of the fibers at the interior of the molded part is obtained by virtue of the flow properties of the material in the channels and/or within the interior volume of the mold.

The nozzles or channels may be oriented obliquely with respect to the surface, perpendicularly or even tangentially.

In an advantageous fashion the fibers will be oriented to a significant extent in a parallel manner to the place of contact of the joint, thus providing improved dynamic sealing.

Under these circumstances, the elastomer constituting the joint will display anisotropic properties and will offer maximum resistance against the forces exerted on the place of contact of the joint by, for example, the butterfly valve. In particular, the resistance of the sealing joint to tearing is improved to a significant extent at ambient temperature. In addition, this solution allows for better control of the fluid operation of the elastomer when it is subjected to compression, and reduces the risk of the propagation of the grooves which can form in the joint.

The fibers used in the process in accordance with the invention may, for example, consist of cellulose or carbon fiber, or of aramidic fibers.

In the case of the cellulose fibers, generally one uses the so-called "short" fibers of variable length from 2 to 12 mm length/diameter ratio shape factors of between 100 and 200, with an optimum value at about 140.

In the case of aramidic fibers, one uses fibers with an average length of 6 mm with diameters on the order of 12 microns. As above, these values may vary from 2 to 12 mm, but the optimum shape factor in this case is about 500.

The formula for the elastomer is of the conventional type, with, however, the addition of HMMM (hexa methoxy methyl melamine) type products at ratios ranging from 1 percent to 15 percent in weight.

The HMMM has the role, by chemical reaction under the effect of temperature, of causing a chemical bond with the greasing of the fiber (greasing is the treating of the surface of the fiber to permit its subsequent bonding with the rubber) and the polymer molecules. This product can be used for fibers of the cellulose type and fibers of the aramidic type.

In the event that one is using carbon fibers, one uses, in preference over the HMMM, HRH (hexamethylene tetramine, resorcinol, silica) system, this system is also able to be used for cotton and cellulose fibers.

The ratio of the products added to the formulation is essentially proportional to the ratio of fibers used in the rubber blend.

Excellent results have been obtained by using the following compositions:

For rubber blends reinforced by aramidic fibers:

| per | 3 parts of fibers | variable from 1 to 15 |
|---|---|---|
| | 1 part of HMMM | in proportion to the fibers |
| | 5 parts of silica | in proportion to the fibers |
| For the cellulose fibers: | | |
| per | 7 parts of fibers | variable from 1 to 15 |
| | 0.6 part of HMMM | in proportion to the fibers |
| | 5 parts of silica | in proportion to the fibers |
| For the systems with HRH: | | |
| per | 5 parts of fibers | variable from 1 to 15 |
| | 2 to 3 parts of resorcinol | fixed |
| | 1.5 parts of hexamethylene | fixed |
| | 5 parts of silica | variable from 1 to 15 |
| | | in proportion to the fibers |

Tests carried out using sealing gaskets for butterfly valves made in accordance with the process of the invention have shown numerous advantages, among which the following are mentioned which have been ascertained for a blend of the EPDM type:

an augmentation of the secant moduluses (the Young Modulus):

the modulus at 100% elongation is augmented by 30%, the modulus at 30% elongation is doubled.

In particular, the mechanical rigidity of the rubber is modified with slight elongations (from 5 to 10 percent):

an augmentation in the resistance to tearing in heat, a modification in the relaxation evaluated by a abnormal test of valve pressure maintenance.

A sealing gasket in accordance with the present invention has the advantage of the augmentation of longevity and durability. One ascertains an improvement in the allowable carrying pressure and in the resistance to heat and an augmentation in the carrying temperature and in the maintenance of the seal over time. In particular, the present invention enables a reduction in the penetration of the wave of the elastomer depressed by the ridge of the closure means and a reduction in relaxation and in the fluidity of the elastomer under the effect of the compression of the ridge. By virtue of this orientation of the fibers, one benefits simultaneously from the very much higher rigidity of the fibers in order to limit the elastic elongation in the direction of the fibers as well as from an augmentation in the resistance against shearing and the elasticity of the elastomer in order to create the contact pressure necessary for sealing. The valve resulting from this invention thus displays an improvement for the two essential concerns of increased performance and more economy.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, the modes of executing the process in accordance with the invention will be described below by means of examples which are not limitative, with reference to the drawings attached, in which.

Figure 7A:
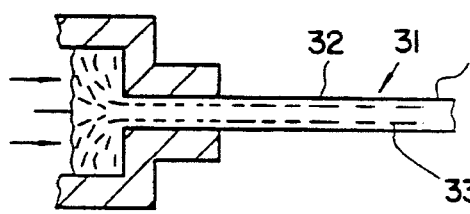
Figure 7B:
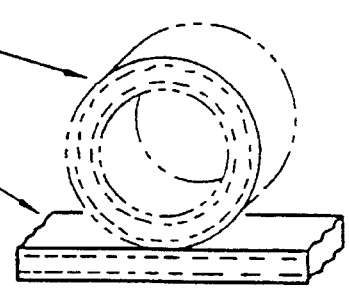
Figure 7C:
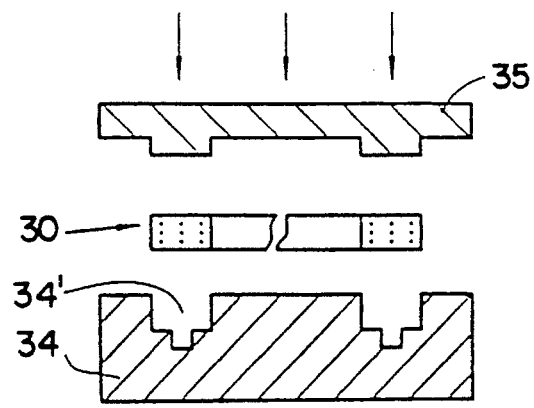
Figure 7D:
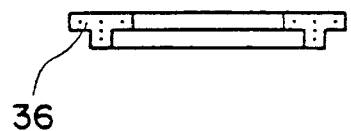
Figure 7E:
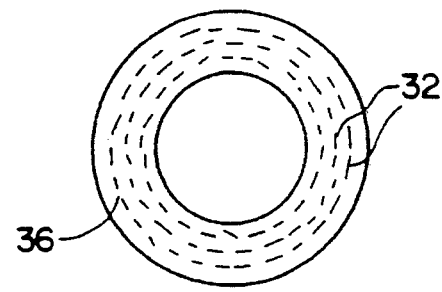
Figure 8A:
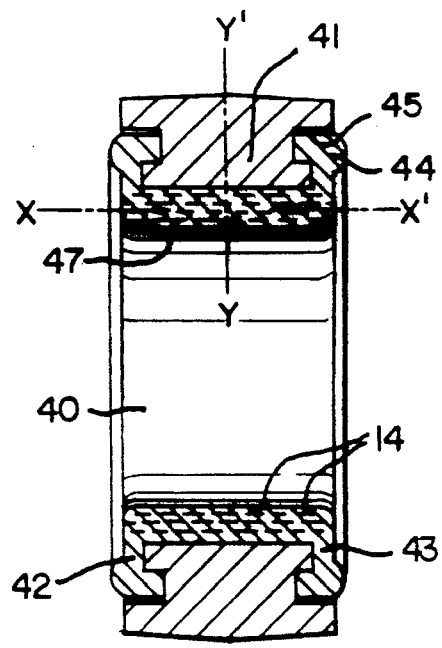
Figure 8B:
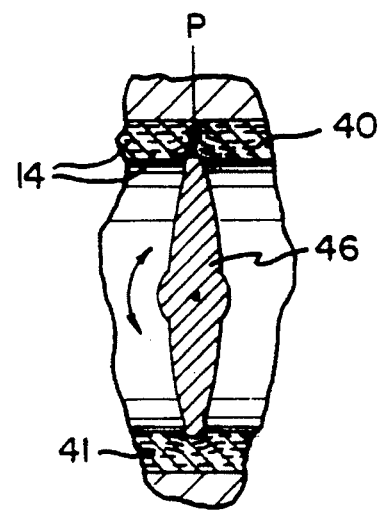

The FIGS. 7a–7e are schematic representations illustrating the various phases of molding by compression, to wit:

the formation of a flat blank by extrusion (FIG. 7a);

the formation of a cylindrical blank from the flat blank (FIG. 7b);

the positioning of the blank in the mold (FIG. 7c);

the extraction of the finished product view in axial section (FIG. 7d) and in radial section (FIG. 7e); and FIG. 8a and FIG. 8b are schematic representations of a butterfly valve provided with a sealing gasket in accordance with the present invention.

DETAILED DESCRIPTION OF THE PRESENTLY PREFERRED EXEMPLARY EMBODIMENT

Figure 1A:
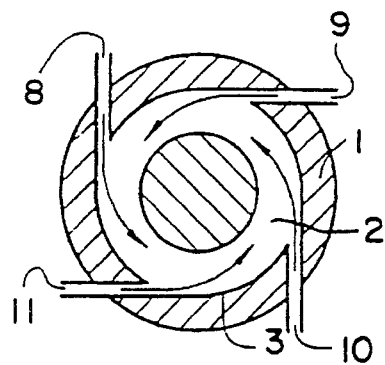
FIG. 1a and FIG. 1b are schematic representations which represent a first mode of injection molding of the tangential type, FIG. 1a showing the mold and FIG. 1b showing the product obtained in the mold.
Figure 1B:
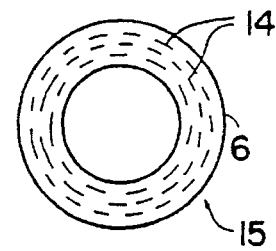

In the example represented in FIG. 1a, the mold 1 includes a cavity 2 in the form of a tubular section which is circular in cross-section, in which there are outlets of the multiple injection nozzles 8, 9, 10 and 11 on tangential axes to the interior cylindrical surface 3 of the mold 1. At the time of the injection of the composition of elastomer and of the fibers, the fibers 14 are spontaneously oriented in the axis of the nozzles 8' to 11' and are thus positioned in the interior of the mold 1 concentrically to the principal axis of the mold 1, and thus parallel to the cylindrical surface 6 of part 15 which may, for example, consist of a gasket which provides dynamic sealing.

Figure 2A:
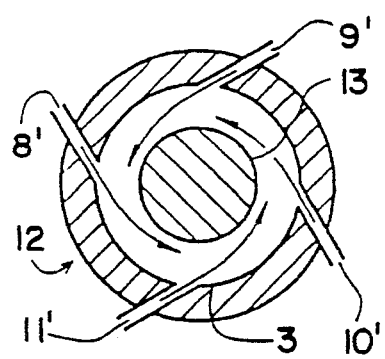
FIG. 2a and FIG. 2b are representations similar to those of FIG. 1a and FIG. 1b, for molding of a type which is not tangential.
Figure 2B:
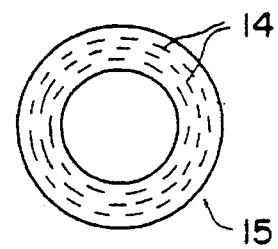

A similar result may be obtained by virtue of a mold 12 of the type represented in FIG. 2a in which the outlets of the injection channels 8' to 11', which are not tangential to the interior surface 3 of the mold but the axes of which are, however, tangential to the concentric circles on the principal axis of the mold (comprised here of tube 13).

One notes that, here too, fibers 14 are positioned concentrically to the principal axis of the part 15.

Figure 3A:
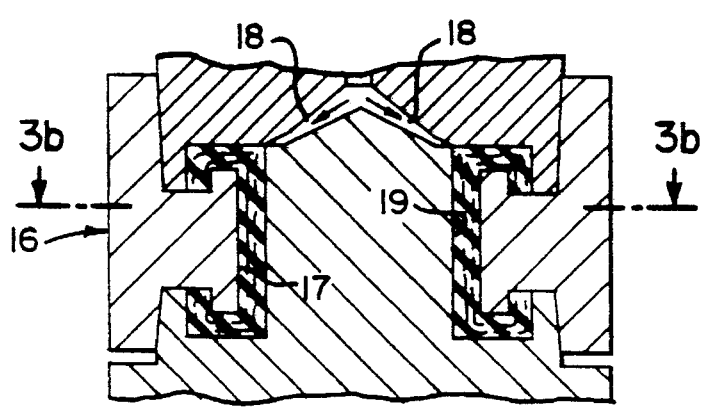
FIG. 3a, FIG. 3b and FIG. 4a, FIG. 4b illustrate two modes of injection in which the preferred orientation of the fibers is obtained by employing the particularities of the flow of the material in the injection channels and/or the molding cavity, FIG. 3a and FIG. 4a being axial sections of the mold and FIG. 3b and FIG. 4b being cross-sections of gaskets made from such molds.
Figure 3B:
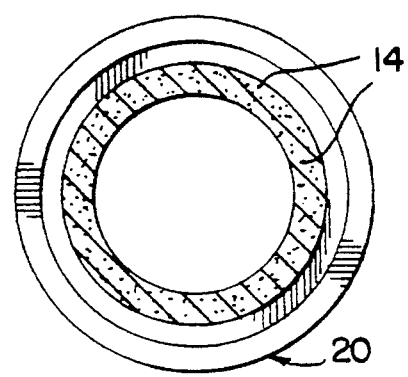

In the example shown in the FIG. 3a, mold 16 displays a cavity 17 in cross-section having the shape of a "C". The injection is carried out here by the use of the multiple channels 18 ejecting at the position of the angular area adjacent to surface 19 bordering the core of the C-form. The orientation of the fibers 14 in the interior of the molded piece 20 is obtained by virtue of the flow properties of the material in the channels 18 and/or within the volume of the interior of the mold.

Figure 4A:
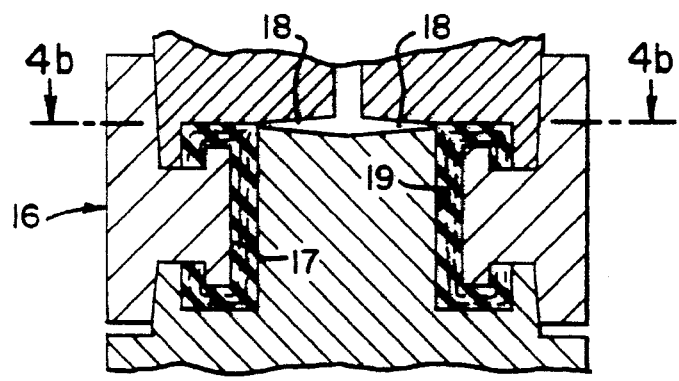
Figure 4B:
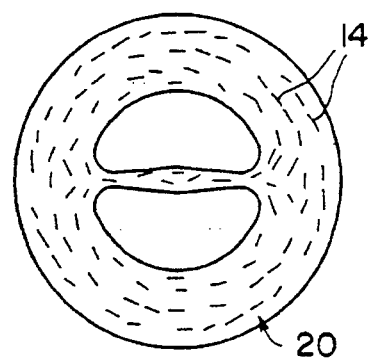
Figure 5A:
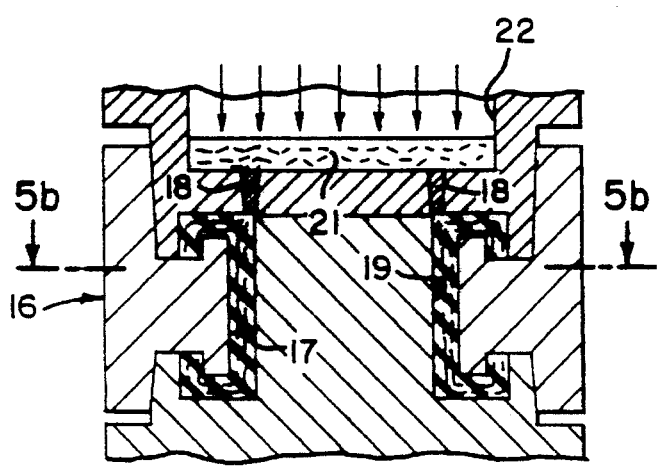
FIG. 5a, FIG. 5b and FIG. 6a, FIG. 6b are, respectively, schematic representations analogous to those of FIG. 3a, FIG. 3b and FIG. 4a, FIG. 4b, illustrating the principle of molding by compression transfer.
Figure 5B:
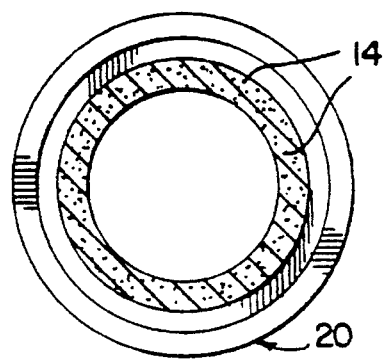
Figure 6A:
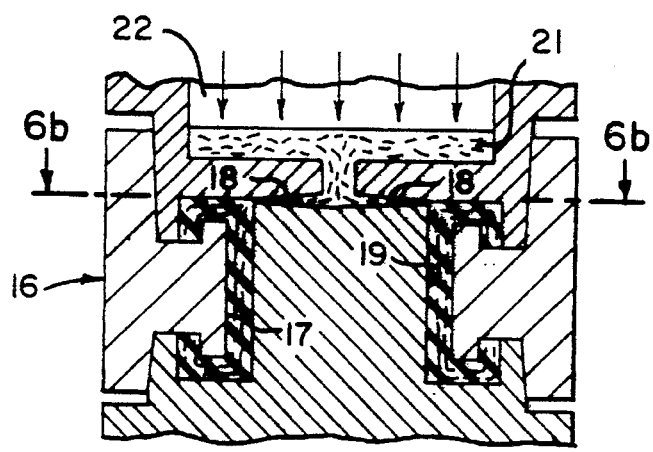
Figure 6B:
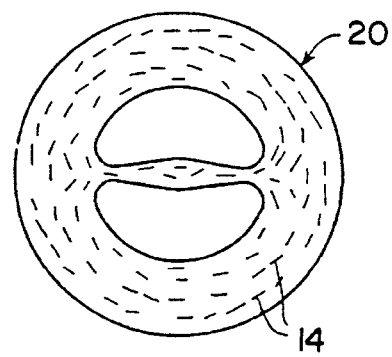

Channels 18 may be oriented obliquely with respect to surface 19, as represented in FIG. 3a, perpendicularly, as represented in FIG. 4a and FIG. 6a, or else tangentially as represented in FIG. 5a.

FIG. 5a and FIG. 6a, which provide illustration of the principle of molding by compression transfer, display a mold 16 which is similar to those represented in FIG. 3a and FIG. 4a, in which the injection channels 18 are connected to a compression chamber 21 which encloses a molding material including the fibers 14. The transfer of the material toward the mold 16 is caused by its compression, in the interior of the chamber 21, by the piston 22. Here too, the orientation of the fibers 14 is a function of the manner of the flow within the channels 18 and within the molding cavity 17.

FIG. 8a and FIG. 8b show the sealing gasket made by molding in accordance with the processes described with reference to FIG. 3a to FIG. 6b. A tubular part 40 covers the internal boring 41 of a butterfly valve, two radial, ringed flanges 42 and 43 turn onto the radial faces of the valve housing, and a ringed lug 44 engages a ringed throat 45 made in the radial faces. The tubular part 40 works with the ridge of the closure means 46 in order to provide the (dynamic) seal upstream or downstream of the valve.

The fibers 14 in the elastomer display a preferred orientation which is parallel to a surface 47 against which the ridge of the closure means 46 comes into contact and perpendicular to the closure means 46 at the time of the penetration of the closure means 46 into the sealing gasket at the time of the shutting of the butterfly valve (See FIG. 8b). The orientation of the fibers 14 makes the elastomer of the sealing gasket anisotropic, with mechanical properties and a behavior which are very different according to the directions.

In the direction X–X', parallel to the sealing surface 47, there is a slight elastic elongation, that is, a great rigidity and a more elevated resistance to shearing. This reduces the formation of a wave in the elastomer at the time of the movement of the closure means. The forces are reduced and the excess dimensioning of the handle extensions and of the manipulators is avoided.

In the direction Y–Y', perpendicular to the sealing surface 47, there is significant elastic deformation which is similar to that of an elastomer without the fibers 14, given that the fluidity and the relaxation of the elastomer are much more weak. This enables the retaining over time of the level of the initial contact pressure (P) and avoids the excess dimensioning of the penetration.

As mentioned above, molding by compression involves two successive phases, to wit: one phase for making a blank and one phase for conforming this blank by compression. It is preferred that the molding or conforming be accomplished substantially simultaneously with a vulcanization step.

In the example illustrated by FIG. 7a to FIG. 7e, the ringed blank 30 is obtained from a rectangular plate 31 made by extrusion (FIG. 7a), the fibers 32 then being positioned in a parallel fashion to the two principal faces 33 and orientation 33' of plate 31.

Plate 31, once incurved in such manner as to present a ringed form (visible in the phantom lines of FIG. 7b), constituting the blank, is put into the form 34 of the mold. The molding operation is then performed by compressing the blank 30 in the interior of the cavity 34' of the form 34 by means of a punch 35 which, at the end of the cycle, totally obturates the form 34, delineating a molding cavity with the shapes of the finished product 36 represented in FIG. 7d and FIG. 7e.

At the time of this molding, the fibers 32 retain the orientation they had displayed in the blank. As one sees in FIG. 7d and FIG. 7e, they are positioned concentrically to the principal axis of the ringed joint constituting the finished product 36.

In this example, the fibers are positioned coaxially, parallel to the cylindrical faces of the part.

It is appropriate to reiterate the fact that the reinforcing of the blend and of the anisotropics by the preferred orientation of the fibers enables modification of the characteristics of the elastomer, particularly its viscous and elastic behavior, this particularly enabling the improvement of:

its resistance in instances of utilization and, in particular, its resistance to tearing under heat, its behavior when hot, the consistency of the contract pressure which it exerts on the closure means, for example.

The process in accordance with the present invention applies in particular to the making of sealing gaskets for valves and, more particularly:

to the sleeves of centered butterfly valves;

to the valve joints of the dynamic jointed and phased butterfly valves made by extrusion;

to the membranes of membrane valves, by improving the resistance to tearing which it provides.

In these applications, one ascertains an improvement:

in the allowable carrying pressure, in the resistance to heat and augmentation of the carrying temperature, the retaining of the seal over time.

From the foregoing description, it will be appreciated that the present invention makes available, a compact, cost efficient process for improving the mechanical and sealing properties of elastomer gaskets. The gasket is designed to allow for simple operation while preventing a failure of the gasket during use.

Having described the presently preferred exemplary embodiment of a new and improved process for improving the mechanical and sealing properties of elastomer gaskets in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claimed is:

1. A sealing gasket of elastomer for providing dynamic sealing in a butterfly valve provided with a closure means comprising:

a plurality of fibers embedded in the elastomer, said fibers having an orientation that is parallel to a surface against which a ridge of the closure means comes into contact and perpendicular to the closure means when the butterfly valve is shut.

* * * * *

UNITED STATES PATENT AND TRADEMARK OFFICE
CERTIFICATE OF CORRECTION

PATENT NO. : 5,532,299
DATED : July 2, 1996
INVENTOR(S) : Jean-Paul DUBOIS

It is certified that error appears in the above-indentified patent and that said Letters Patent is hereby corrected as shown below:

Title page, [30], Foreign Application Priority Data, add
--Apr. 4, 1991    PCT . . . . . . . . . . . PCT/FR91/00272--.

Signed and Sealed this

Fifteenth Day of October, 1996

*Attest:*

BRUCE LEHMAN

*Attesting Officer    Commissioner of Patents and Trademarks*